United States Patent
Khoshnevisan et al.

(10) Patent No.: US 11,350,419 B2
(45) Date of Patent: May 31, 2022

(54) SEMI-PERSISTENT SCHEDULING (SPS) FOR MULTI-DCI BASED MULTI-TRANSMITTER RECEIVER POINT (TRP)

(71) Applicant: QUALCOMM Incorporated, San Diego, CA (US)

(72) Inventors: Mostafa Khoshnevisan, San Diego, CA (US); Tao Luo, San Diego, CA (US); Xiaoxia Zhang, San Diego, CA (US); Jing Sun, San Diego, CA (US); Seyed Ali Akbar Fakoorian, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 16/914,068

(22) Filed: Jun. 26, 2020

(65) Prior Publication Data

US 2020/0413411 A1 Dec. 31, 2020

Related U.S. Application Data

(60) Provisional application No. 62/914,305, filed on Oct. 11, 2019, provisional application No. 62/868,576, filed on Jun. 28, 2019.

(51) Int. Cl.
*H04W 72/04* (2009.01)
*H04L 5/00* (2006.01)
(Continued)

(52) U.S. Cl.
CPC ...... *H04W 72/0493* (2013.01); *H04B 7/0456* (2013.01); *H04L 1/1819* (2013.01);
(Continued)

(58) Field of Classification Search
CPC ............... H04L 5/0055; H04L 1/1819; H04W 72/0466; H04W 72/0493; H04W 72/042; H04B 7/0456
See application file for complete search history.

(56) References Cited

U.S. PATENT DOCUMENTS

2020/0313809 A1* 10/2020 Park ................. H04L 1/1812
2020/0314880 A1* 10/2020 Cirik ................ H04L 5/0053
(Continued)

OTHER PUBLICATIONS

Intel Corporation: "On Multi-TRP/Multi-Panel Transmission", 3GPP Draft, R1-1907559, 3GPP TSG RAN WG1 Meeting #97, MultiTRP_FinalR2, 3rd Generation Partnership Project (3GPP), Mobile Competence Centre, 650, Route Des Lucioles, F-06921 Sophia-Antipolis Cedex, France, vol. RAN WG1. No. Reno, Nevada, USA, May 13, 2019-May 17, 2019, May 13, 2019 (May 13, 2019), XP051728992, pp. 1-21, Retrieved from the Internet: URL: http://www.3gpp.org/ftp/Meetings%5F3GPP%5FSYNC/RAN1/Docs/R1%2D1907559%2Ezip [retrieved on May 13, 2019] Section 5.2 Figure 1.
(Continued)

*Primary Examiner* — Wei Zhao
(74) *Attorney, Agent, or Firm* — Patterson + Sheridan, L.L.P.

(57) ABSTRACT

Certain aspects of the present disclosure provide techniques for processing semi-persistent scheduling (SPS) transmissions activated with downlink control information (DCI) transmissions in a system with multiple transmitter receiver points (TRPs).

28 Claims, 14 Drawing Sheets

(51) Int. Cl.
H04L 1/18        (2006.01)
H04B 7/0456      (2017.01)
(52) U.S. Cl.
CPC ......... *H04L 5/0055* (2013.01); *H04W 72/042* (2013.01); *H04W 72/0466* (2013.01)

(56) References Cited

U.S. PATENT DOCUMENTS

| | | | | |
|---|---|---|---|---|
| 2020/0413425 | A1* | 12/2020 | Lin | H04L 5/0053 |
| 2021/0044403 | A1* | 2/2021 | Zhang | H04W 72/0406 |
| 2021/0153185 | A1* | 5/2021 | Schober | H04L 5/0051 |
| 2021/0160893 | A1* | 5/2021 | Gao | H04W 72/0446 |
| 2021/0250973 | A1* | 8/2021 | Miao | H04L 5/0091 |

OTHER PUBLICATIONS

International Search Report and Written Opinion—PCT/US2020/040019—ISA/EPO—dated Dec. 3, 2020.
NTT DOCOMO., et al., "Physical Layer Enhancements for DL SPS," 3GPP Draft, 3GPP TSG RAN WG1 #97, R1-1906219, 3rd Generation Partnership Project (3GPP), Mobile Competence Centre, 650, Route Des Lucioles, F-06921 Sophia-Antipolis Cedex, France, vol. RAN WG1. No Reno, USA, May 13, 2019-May 17, 2019, May 13, 2019 (May 13, 2019), XP051727673, 7 Pages, Section 2, Section 4 figures 1.2, Paragraph [0004].
Partial International Search Report—PCT/US2020/040019—ISA/EPO—dated Oct. 9, 2020.

\* cited by examiner

SEMI-PERSISTENT SCHEDULING (SPS) FOR MULTI-DCI BASED MULTI-TRANSMITTER RECEIVER POINT (TRP)

PRIORITY CLAIM(S)

This application claims priority to and the benefit of U.S. Provisional Application No. 62/868,576, filed on Jun. 28, 2019, and 62/914,305, filed on Oct. 11, 2019 which are expressly incorporated by reference in their entirety as if fully set forth below and for all applicable purposes.

FIELD OF THE DISCLOSURE

Aspects of the present disclosure relate to wireless communications, and more particularly, to techniques for processing semi-persistent scheduling (SPS) transmissions activated with downlink control information (DCI) transmissions in a system with multiple transmitter receiver points (TRPs).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes detecting at least one downlink control information (DCI) from each of at least first and second transmission reception points (TRPs), each DCI activating semi-persistently scheduled (SPS) physical downlink shared channel (PDSCH) transmissions according to an SPS configuration, detecting an SPS PDSCH transmission from each of the first and second TRPs, determining codebook resources to use for providing acknowledgement feedback for the SPS PDSCH transmissions, and providing acknowledgement feedback for the SPS PDSCH transmissions in accordance with the determination.

Certain aspects provide a method for wireless communication by a user equipment (UE). The method generally includes receiving signaling of configurations for at least first and second semi-persistently scheduled (SPS) configurations associated with at least first and second control resource sets (CORESETs), detecting at least one downlink control information (DCI) activating or releasing the first or second SPS configuration, and determining whether the activation or release is for the first or second SPS configuration.

Certain aspects provide a method for wireless communication by a user equipment (UE). The method generally includes receiving signaling of configurations for at least first and second semi semi-persistently scheduled (SPS) configurations associated with at least first and second control resource sets (CORESETs), each CORESET associated with a CORESET group identified by an index, detecting at least one downlink control information (DCI) in at least one of the first CORESET or the second CORESET activating the first or second SPS configuration, and determining a data scrambling identity for one or more SPS physical downlink shared channels (PDSCHs) of the activated SPS configuration based on a CORESET group in which the DCI was detected.

Certain aspects provide means for, apparatus, and/or computer readable medium having computer executable code stored thereon, for performing the techniques described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
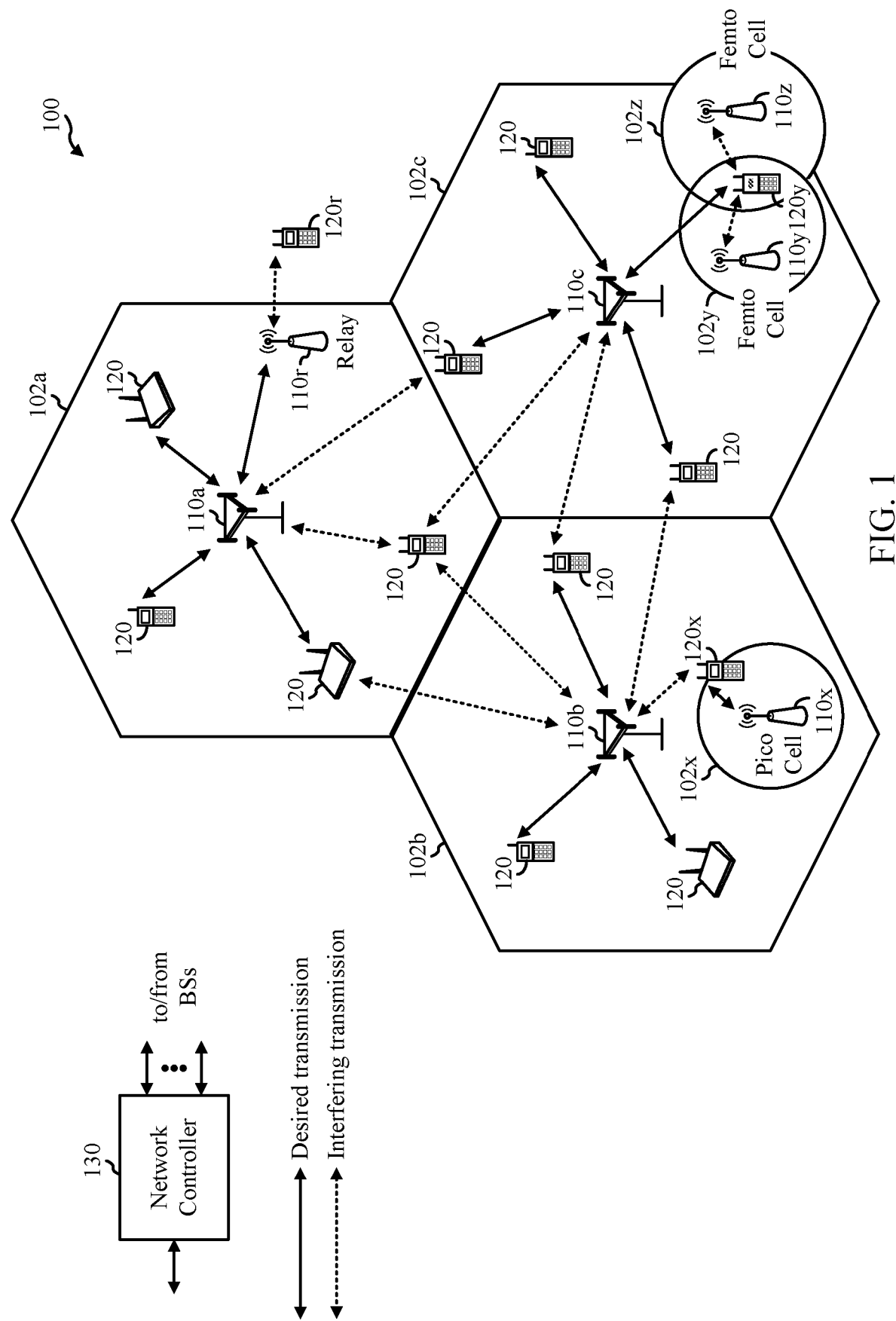
FIG. 1 is a block diagram conceptually illustrating an example telecommunications system, in accordance with certain aspects of the present disclosure.

Aspects of the present disclosure provide apparatus, methods, processing systems, and computer readable mediums for processing semi-persistent scheduling (SPS) transmissions activated with downlink control information (DCI) transmissions in a system with multiple transmitter receiver points (TRPs).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 of FIG. 1 may be configured to perform operations described below with reference to FIGS. 8, 12, and/or 13, to process SPS transmissions in multi-TRP systems.

The wireless communication network 100 may be, for example, a New Radio (NR) or 5G network. BSs 110 may be involved in a multiple transmission reception point (multi-TRP) transmission to a UE 120, in accordance with operations described below with reference to FIGS. 8, 12, and 13 below.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
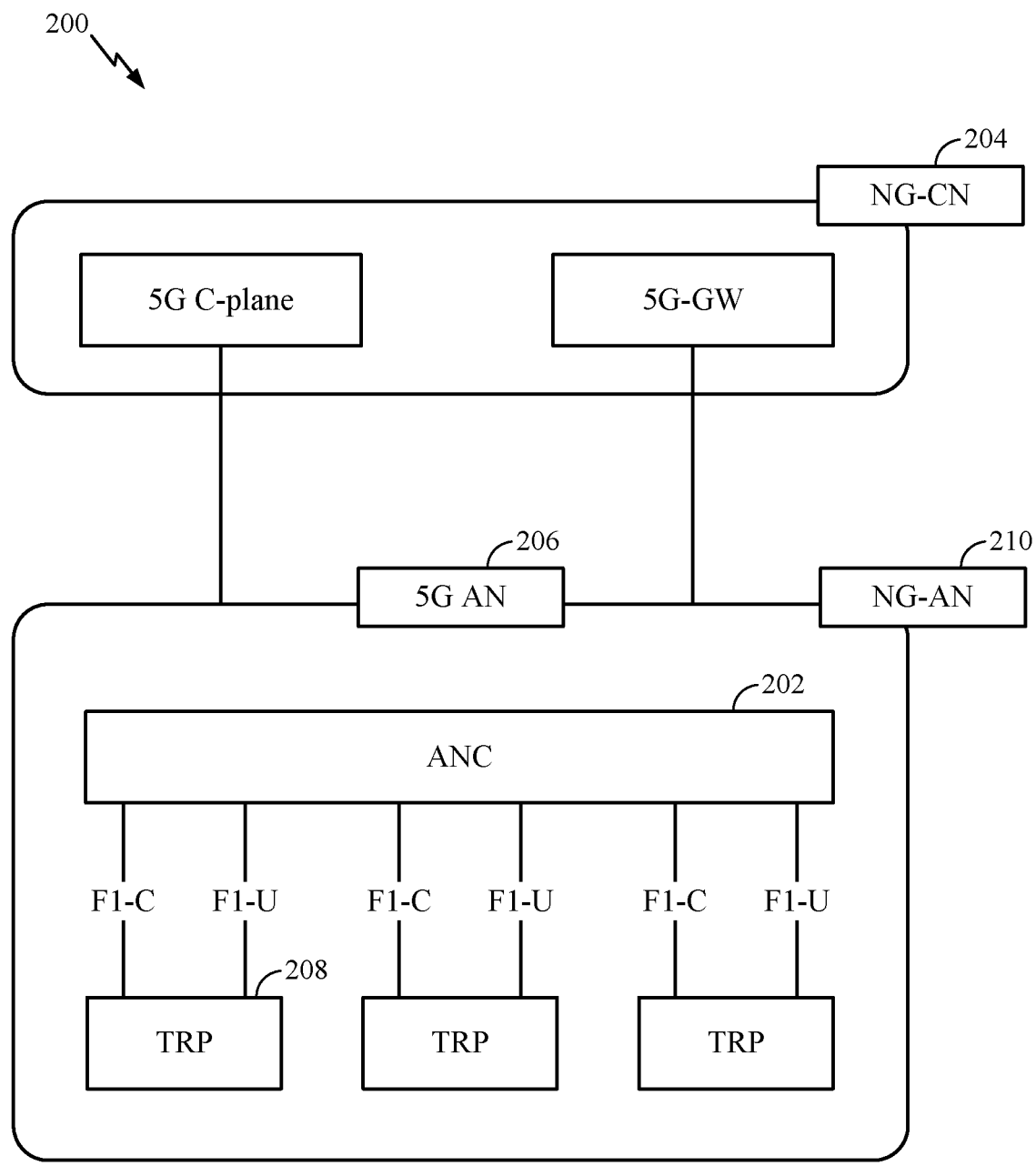
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
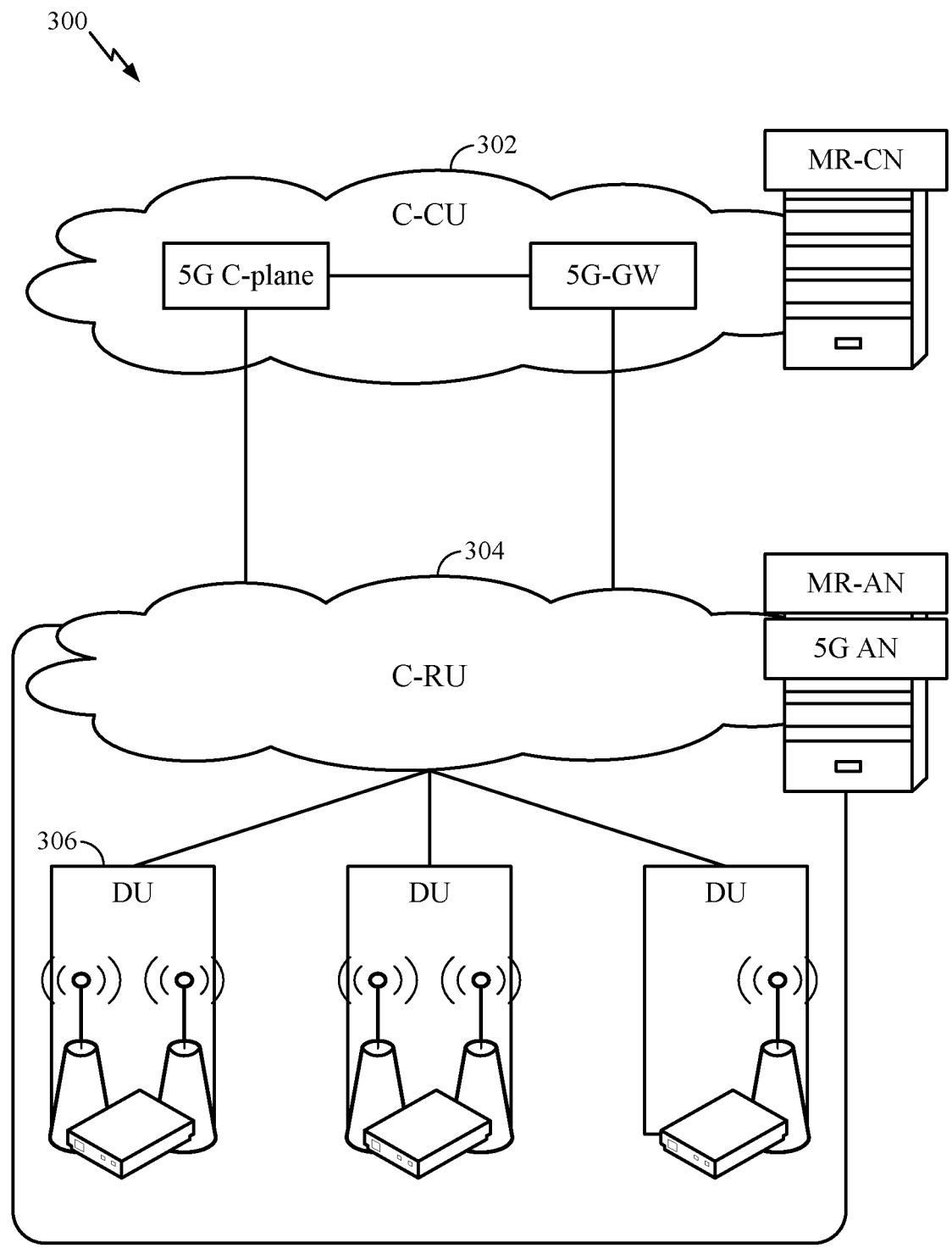
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
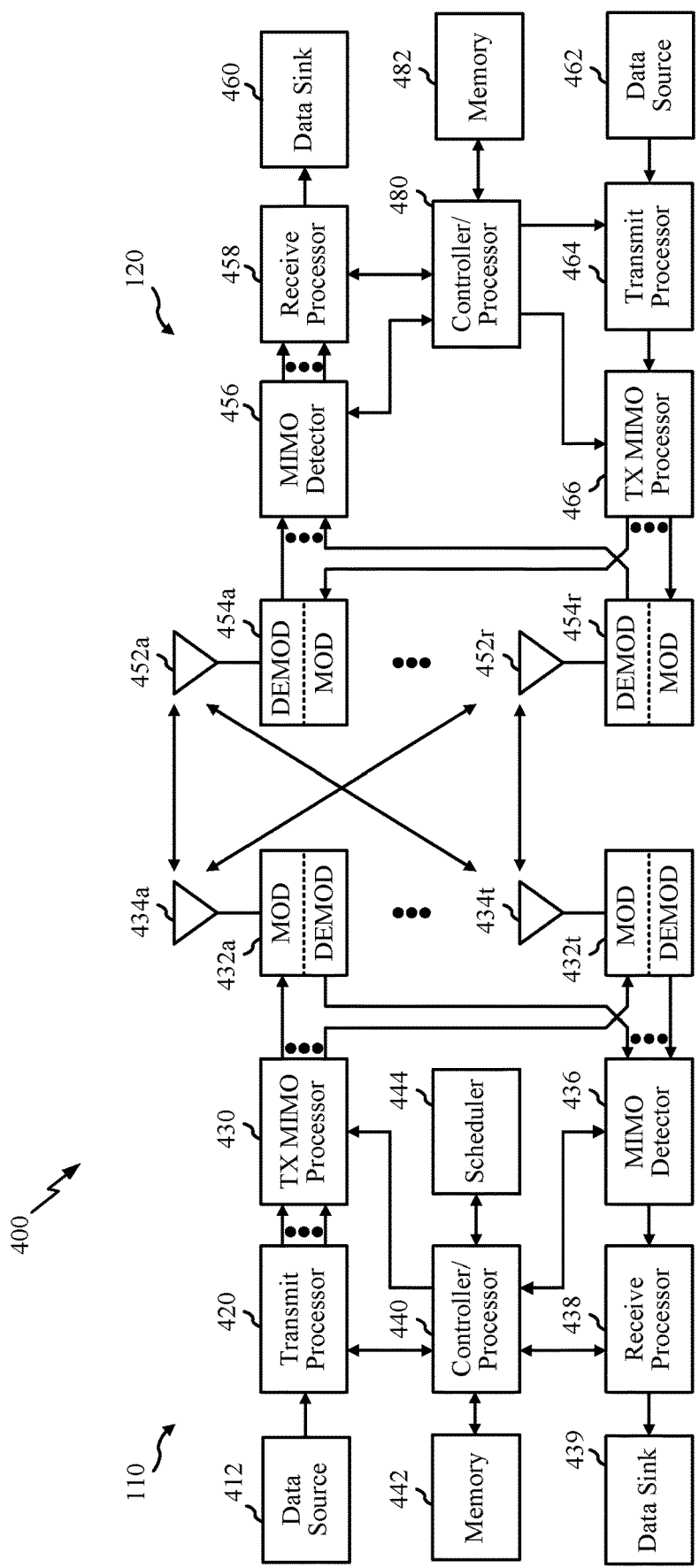
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform the various operations described herein with respect to FIGS. 8, 12, and/or 13.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the B S 110 and the UE 120, respectively. The processor 440 and/or other processors and modules at the BS 110 may perform or direct the execution of processes for the techniques described herein. The memories 442 and 482 may store data and program codes for B S 110 and UE 120, respectively. A scheduler 444 may schedule UEs for data transmission on the downlink and/or uplink.

Figure 5:
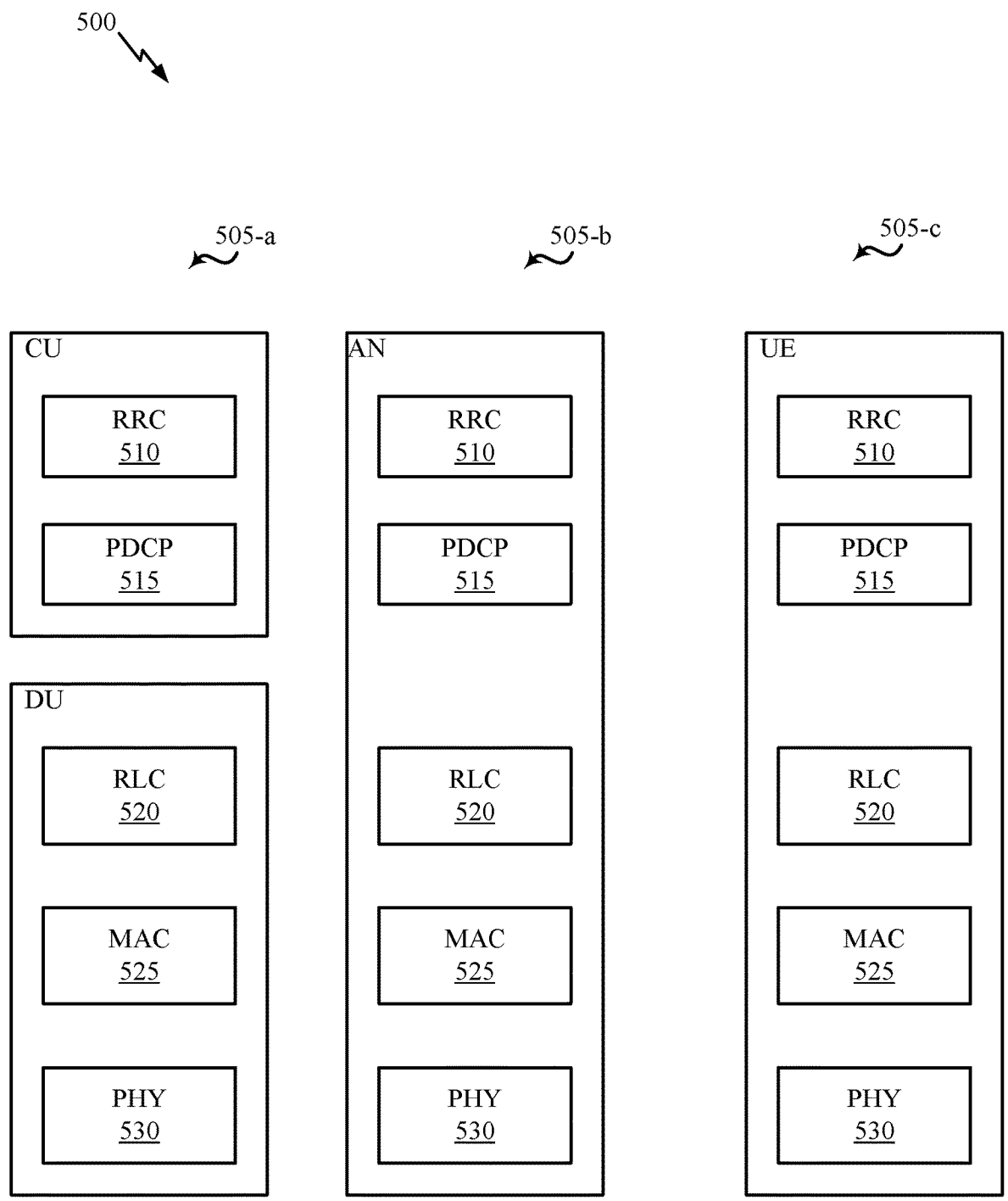
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
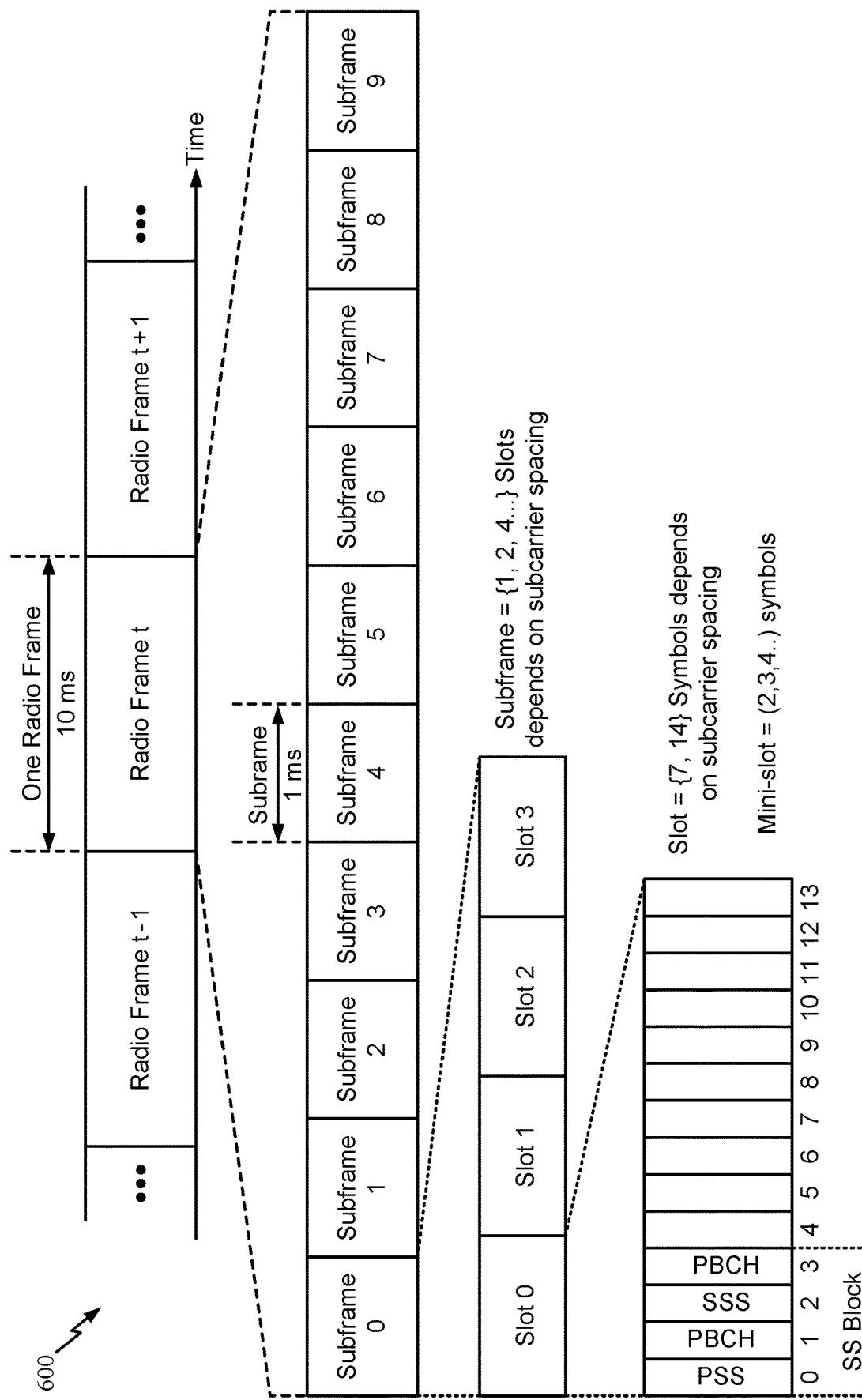
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched.

The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example SPS for Multi-DCI Based Multi-TRP Scenarios

Figure 7:
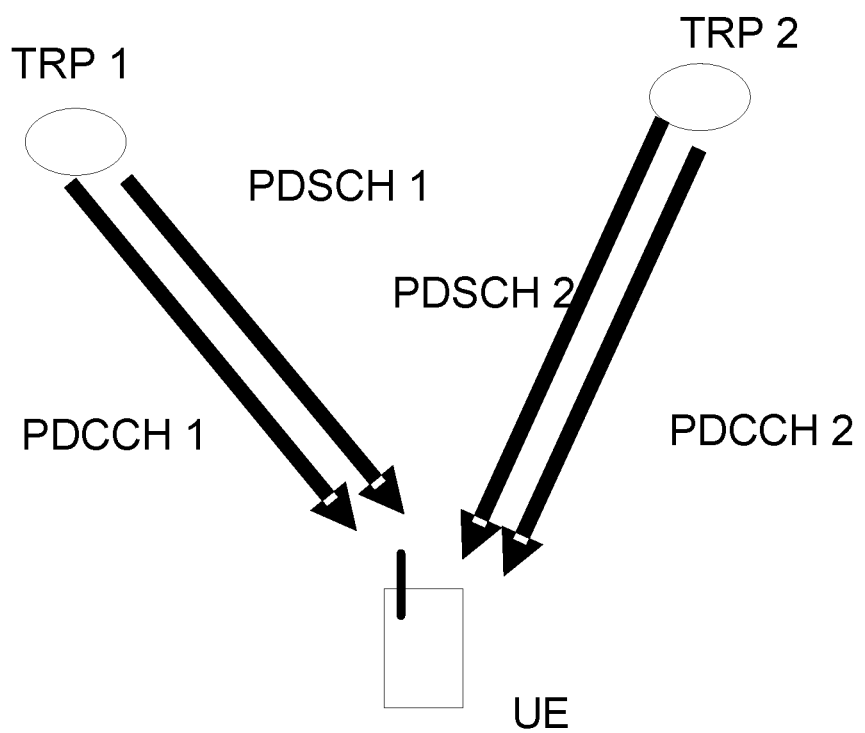
FIG. 7 is a diagram illustrating an example multiple transmission reception point (TRP) transmission scenario, in accordance with certain aspects of the present disclosure.

NR networks are expected to utilize multiple transmission and reception points (TRPs) to improve reliability and capacity performance through flexible deployment scenarios. For example, allowing UEs to access wireless networks via multi-TRPs may help support increased mobile data traffic and enhance the coverage. Multi-TRPs may be used to implement one or more macro-cells, small cells, pico-cells, or femto-cells, and may include remote radio heads, relay nodes, and the like. FIG. 7 illustrates an example multi-TRP scenario, in which two TRPs (TRP 1 and TRP 2) serve a UE.

As illustrated in FIG. 7, for multi-TRP transmission, multiple PDCCHs (each transmitted from a different one of the multiple TRPs) may be used for scheduling. Each PDCCH may include corresponding downlink control information (DCI).

For example, PDCCH1 (transmitted from TRP 1) may carry a first DCI that schedules a first codeword (CW1) to be transmitted from TRP1 in PDSCH1. Similarly, PDCCH2 (transmitted from TRP2) may carry a second DCI that schedules a second codeword (CW2) to be transmitted from TRP2 in PDSCH2.

In a 2-DCI based design multi-TRP transmission, such as that shown in FIG. 7, the backhaul (BH) condition for communication between the two TRPs can be ideal (relatively little BH latency) or non-ideal (substantial BH latency).

For monitoring the DCIs transmitted from different TRPs, a number of different control resource sets (CORESETs) may be used. As used herein, the term CORESET generally refers to a set of physical resources (e.g., a specific area on the NR Downlink Resource Grid) and a set of parameters that is used to carry PDCCH/DCI. For example, a CORESET may by similar in area to an LTE PDCCH area (e.g., the first 1, 2, 3, 4 OFDM symbols in a subframe).

In some cases, TRP differentiation at the UE side may be based on CORESET groups. CORESET groups may be defined by higher layer signaling of an index per CORESET which can be used to group the CORESETs. For example, for 2 CORESET groups, two indexes may be used (i.e. index=0 and index=1). Thus, a UE may monitor for transmissions in different CORESET groups and infer that transmissions sent in different CORESET groups come from different TRPs. Otherwise, the notion of different TRPs may be transparent to the UE.

For HARQ-Ack (Ack/Nack or simply A/N) feedback corresponding to PDSCH transmissions scheduled by different TRPs (e.g., two in the example of two CORESET groups), there are various options. One option is to provide joint A/N feedback (carried on the same PUCCH), which may be applicable to deployments with an ideal BH. Joint A/N in this case may be similar to the downlink carrier aggregation (DL CA) case where a joint downlink assignment index (DAI) counting process for type 2 feedback, and candidate PDSCH occasions may be independent per TRP (e.g., per CORESET group, for type 1).

Another option is to use separate A/N feedback (e.g., carried on separate PUCCHs), which may be applicable to both ideal and non-ideal BH deployments. If A/N is transmitted in the same slot, the A/N codebook may be separated based on the CORESET group in which the DCI scheduling the PDSCH is received. For type 1 codebook (semi-static) feedback, the determination of candidate PDSCH reception occasions may be independent across the two (or more) CORESET groups. For type 2 codebook (dynamic) feedback, the DAI counting process may be independent for DCIs received in different CORESET groups.

In certain systems (e.g., Rel 15), only one active DL SPS configuration (process) may be supported per PUCCH group. In such cases, there may be at least two forms of A/N feedback for SPS: for PDSCH SPS reception and for SPS release. In general, if a UE receives a PDSCH without receiving a corresponding PDCCH, or if the UE receives a PDCCH indicating a SPS PDSCH release, the UE may generate one corresponding HARQ-ACK information bit. In a given slot, only 1 bit of HARQ-ACK feedback is generated for PDSCH SPS reception. In other words, a UE does not expect to be in a scenario where it is to transmit HARQ-ACK information for more than one SPS PDSCH receptions in a same PUCCH.

For Type 1 codebook feedback, the location of the HARQ-Ack bit in the codebook corresponds to the actual received DL SPS. A location in the Type-1 HARQ-ACK codebook for HARQ-ACK information corresponding to a SPS PDSCH release may be the same as for a corresponding SPS PDSCH reception (e.g., only one of them is expected for A/N reporting in a codebook).

For Type 2 codebook feedback, the UE may append 1 bit of A/N to the end of the HARQ-Ack codebook for PDSCH SPS reception (e.g., if SPS is activated and UE is configured to receive SPS PDSCH in a slot n−K1, where K1 is the PDSCH-to-HARQ-feedback timing value and n is the PUCCH slot in which the HARQ-Ack codebook is to be transmitted). For SPS release, there may be separate A/N feedback if the corresponding DCI is received with K1 value pointing to the same slot for PUCCH transmission of A/N, and the location is determined based on DAI in the dynamic codebook.

If a UE transmits HARQ-ACK information corresponding only to a PDSCH reception without a corresponding PDCCH (e.g., an SPS PDSCH reception), a PUCCH resource for the corresponding PUCCH transmission with HARQ-ACK information may be provided by n1PUCCH-AN (configured as part of SPS-Config). Otherwise (if the codebook also contains A/N for a PDSCH scheduled by DCI or Ack for an SPS release), the PUCCH resource indicator (PRI) field in the DCI may be used for the PUCCH resource selection.

Certain systems (e.g., Rel-16) may be designed to support multiple active DL SPS configurations per PUCCH group. For example, to support multiple service types, multiple SPS configurations may be supported for a single-TRP (which is not necessarily related to multi-TRP). There are various options for the details of HARQ-Ack codebook construction and PUCCH resource selection in such cases.

Aspects of the present disclosure may help address various challenges providing A/N feedback for SPS transmissions in multi-TRP scenarios (e.g., A/N feedback corresponding to PDSCH transmissions scheduled without corresponding PDCCH transmissions according to an SPS configuration or for SPS release). In general, the feedback approaches may be considered as two cases: Separate A/N feedback to different TRPs or Joint A/N feedback. Further, Type 1 (Semi-static) and Type 2 (Dynamic) codebook types are possible.

Aspects of the present disclosure may provide techniques to use these approaches and types of codebooks to address different scenarios. According to a first scenario (Scenario 1), only one SPS configuration may be allowed per cell group. According to a second scenario (Scenario 2), two SPS configurations may be allowed per cell group, but these SPS configurations may belong to different TRPs. According to a third scenario (Scenario 3), multiple SPS configurations are allowed per cell group, and these SPS configurations may belong to the same or different TRPs. Scenario 3 may be considered a generalized version of Scenario 2, where more than one SPS configuration per TRP is possible. Within one TRP, how to handle A/N feedback for multiple SPS transmissions may be similar to the case of multiple SPS configurations for single-TRP.

Aspects of the present disclosure may also help address SPS activation, SPS release, and PDSCH scrambling for SPS in multi-TRP scenarios.

Figure 8:
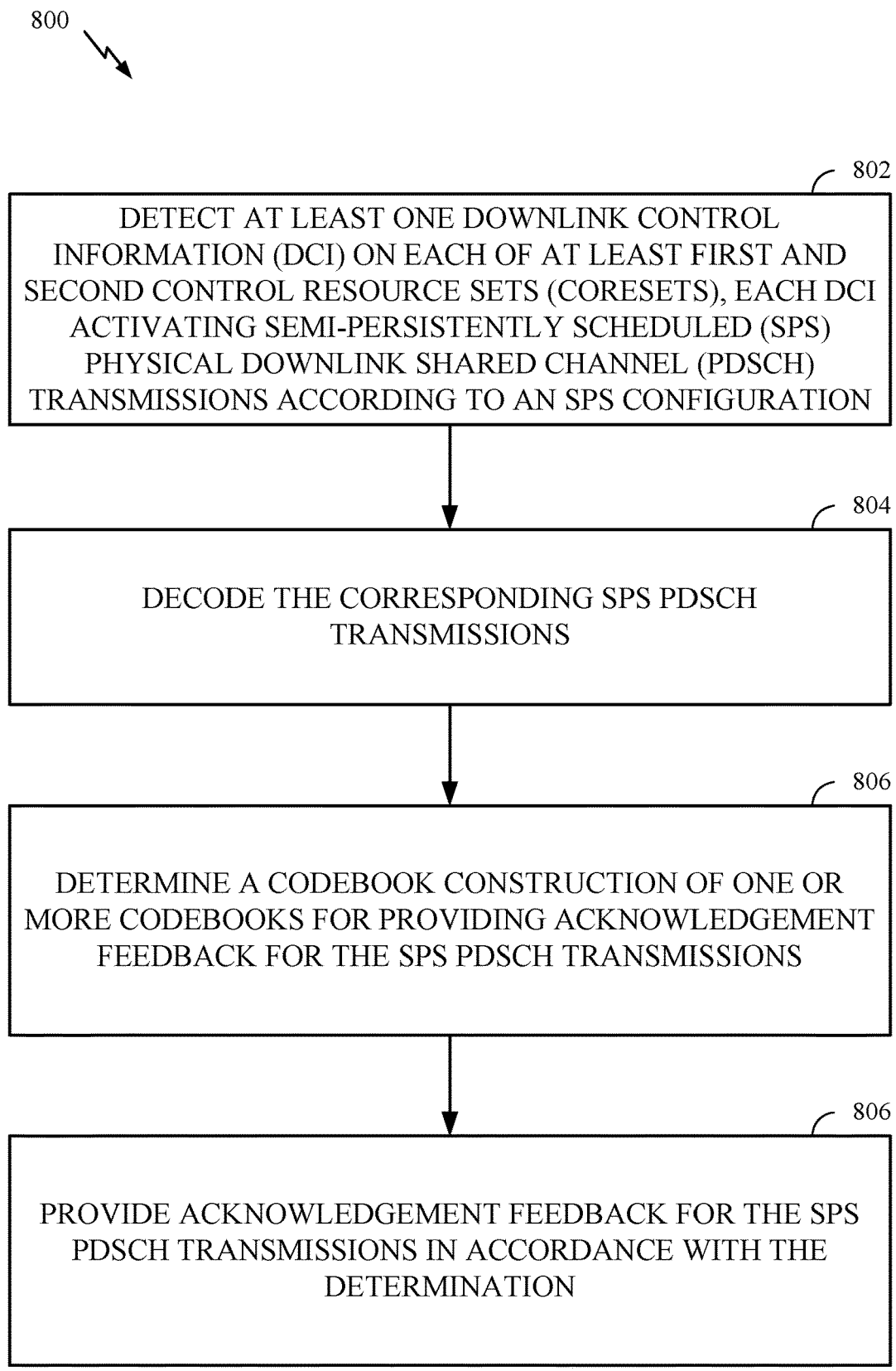
FIG. 8 is a flow diagram illustrating example operations that may be performed by a UE, in accordance with certain aspects of the present disclosure.

FIG. 8 illustrates example operations 800 for handling SPS transmissions in multi-TRP scenarios, in accordance with certain aspects of the present disclosure. The operations 800 may be performed, for example, by a UE (e.g., such as a UE 120 in the wireless communication network 100) for processing SPS PDSCH transmissions.

The operations 800 begin, at 802, by detecting at least one downlink control information (DCI) on each of at least first and second control resource sets (CORESETs), each DCI activating semi-persistently scheduled (SPS) physical downlink shared channel (PDSCH) transmissions according to an SPS configuration.

At 804, the UE decodes an SPS PDSCH transmission on each of the first and second CORESETs. In some cases, CORESETs may be grouped (e.g., with CORESETs in the same group having a same index) and TRPs may be distinguished based on CORESET groups.

At 806, the UE determines a codebook construction of one or more codebooks for providing acknowledgement feedback for the SPS PDSCH transmissions. For example, the UE may determine whether separate codebooks are used (to provide separate feedback for different SPS transmission on different CORESET groups) or a single codebook (to provide joint feedback for different SPS transmission on different CORESET groups). At 808, the UE provides acknowledgement feedback for the SPS PDSCH transmissions in accordance with the determination.

As noted above, the techniques presented herein may be applied to the various scenarios described above.

For example, for one SPS configuration (Scenario 1), in the case of separate feedback (Case 1), an A/N bit for SPS PDSCH reception or for SPS release may be allowed in only one of the two codebooks, with the codebook determined according to one of various alternatives. For example, according to a first alternative, the codebook associated with a first CORESET group (e.g., index 0) may be used. In some cases, SPS activation/release may be constrained so it is only received in a PDCCH in the first CORESET group. According to a second alternative, which codebook can have A/N for SPS PDSCH reception/release may depend on determining that the SPS activation/release is received on which CORESET group.

For one SPS configuration (Scenario 1), in the case of joint feedback (Case 2), existing rules for HARQ-Ack codebooks may suffice. In such cases, however, there may be a constraint that SPS activation/release can be only received in a PDCCH in one of the CORESET groups.

For the case of two SPS configurations corresponding to different TRPs (Scenario 2), in the case of separate feedback (Case 1), an A/N bit for SPS PDSCH reception or for SPS release may be carried in the corresponding codebook, which is determined based on the CORESET group in which the DCI activating/releasing a SPS configuration is received.

Figure 9:
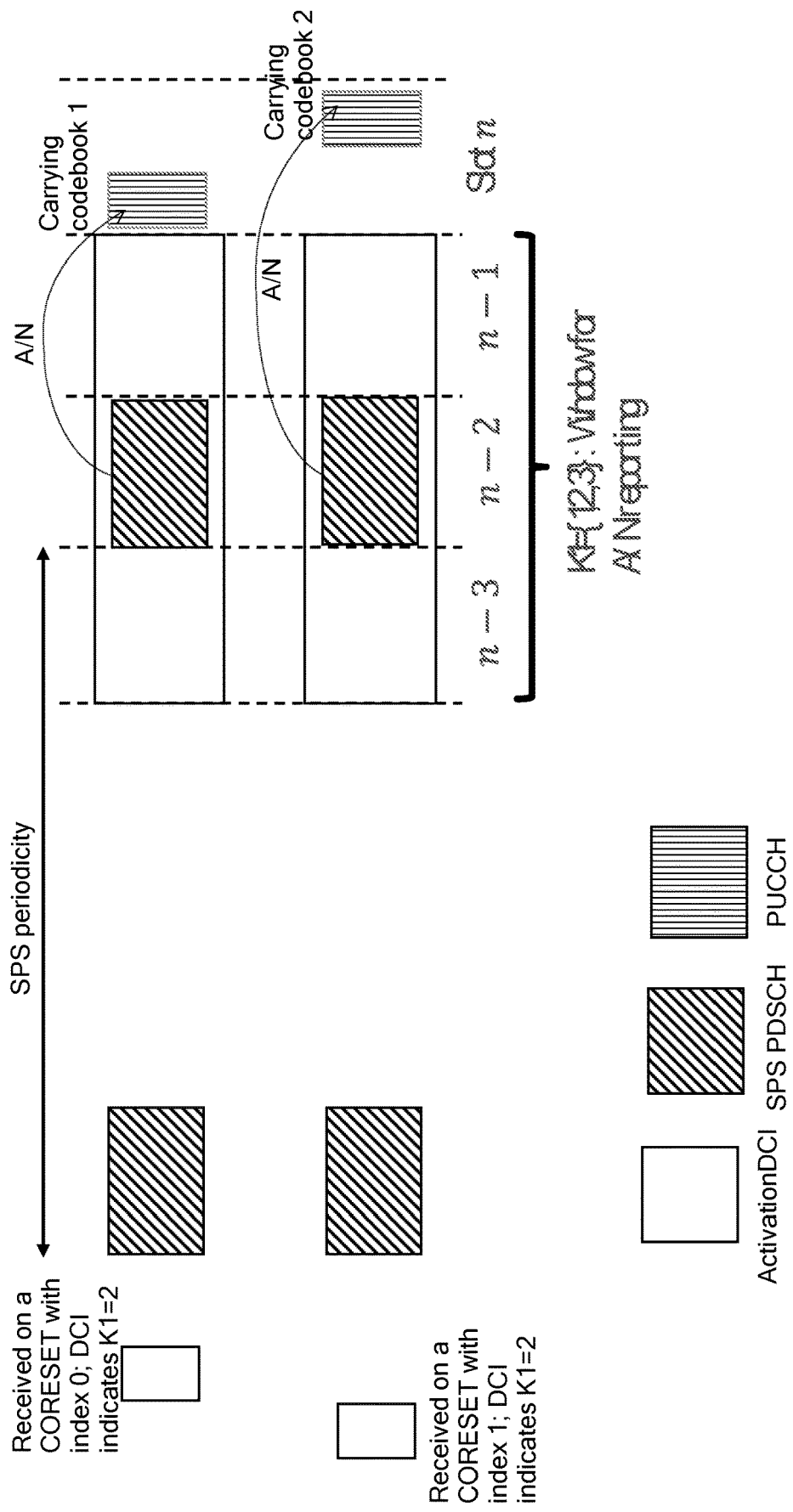
FIGS. 9-11A illustrate example scenarios in which the operations of FIG. 8 may be applied, in accordance with certain aspects of the present disclosure.

FIG. 9 illustrates an example of two SPS configurations corresponding to different TRPs, in the case of separate feedback (Scenario 2, Case 1). As illustrated, a UE may receive a first DCI on a first CORESET group (e.g., a CORESET with index 0) activating SPS PDSCH transmissions with an indication of K1=2. The parameter K1 generally refers to a scheduling parameter indicating the timing from a PDSCH transmission to the corresponding HARQ feedback.

The UE may also receive a second DCI activating an SPS configuration associated with a second CORESET group (e.g., a CORESET with index 1) with an indication of K1=2. In this case, separate PUCCH resources may be used to provide A/N feedback for the SPS PDSCH transmission received in the different CORESET groups. For example, as illustrated, the UE may send a first PUCCH carrying A/N bits from a first codebook (codebook 1 associated with CORESET group 1) and a second PUCCH carrying A/N bits from a second codebook (codebook 2 associated with CORESET group 2).

It may be noted that regular PDSCHs (scheduled by corresponding PDCCH) are not shown in FIG. 9 and, if scheduled, corresponding A/N may also be part of the same codebooks. A/N feedback for SPS release is also not shown in FIG. 9.

For the case of two SPS configurations corresponding to different TRPs (Scenario 2) and joint feedback (Case 2) Type 1 and Type 2 codebook types may be supported. For Type 1 codebook, up to 2 bits of A/N may be allowed in the codebook and the two bits correspond to the two SPS configurations. The location of A/N bits are separately determined based on candidate PDSCH occasions corresponding to the two CORESET groups; Within all A/N bits corresponding to a CORESET group, the location of A/N (whether for SPS PDSCH reception or SPS release) is based on the actual received DL SPS.

Figure 10:
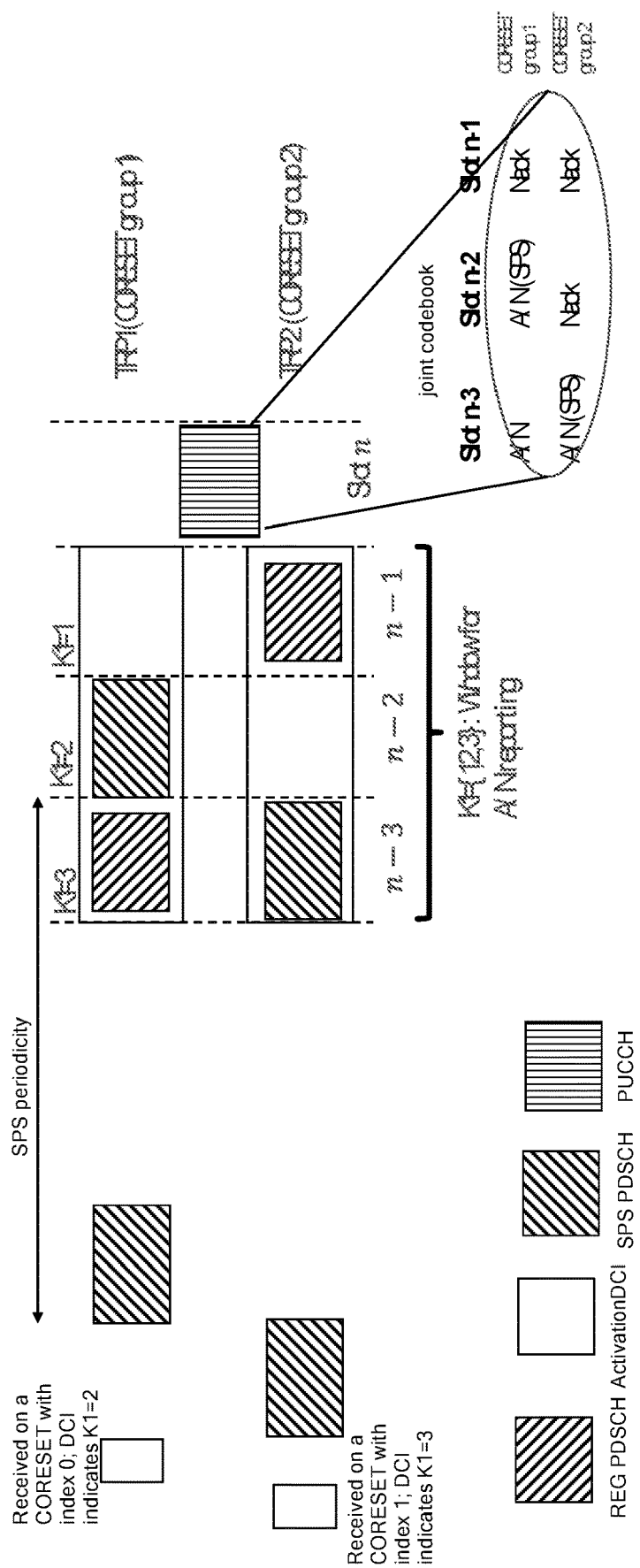

FIG. 10 illustrates an example of two SPS configurations corresponding to different TRPs, in the case of separate feedback (Scenario 2, Case 2) with Type 1 codebook. As illustrated, a UE may again receive a first DCI on a first CORESET group (e.g., a CORESET with index 0) activating SPS PDSCH transmissions with an indication of K1=2.

The UE may also receive a second DCI activating an SPS configuration associated with a second CORESET group (e.g., a CORESET with index 1), but with an indication of K1=3. In this case, the different values of K1 result in SPS PDSCH transmissions that occur in different occasions (slots n−3 and n−2) within an A/N reporting window may be acknowledged with a single PUCCH transmission in a same slot n. As illustrated, entries in a joint codebook may have bits for acknowledging the SPS PDSCH transmissions sent in the different CORESET groups.

It may be noted that DCI for regular PDSCHs (scheduled by corresponding PDCCH) are not shown in FIG. 10 and neither is A/N feedback for SPS release.

Figure 11:
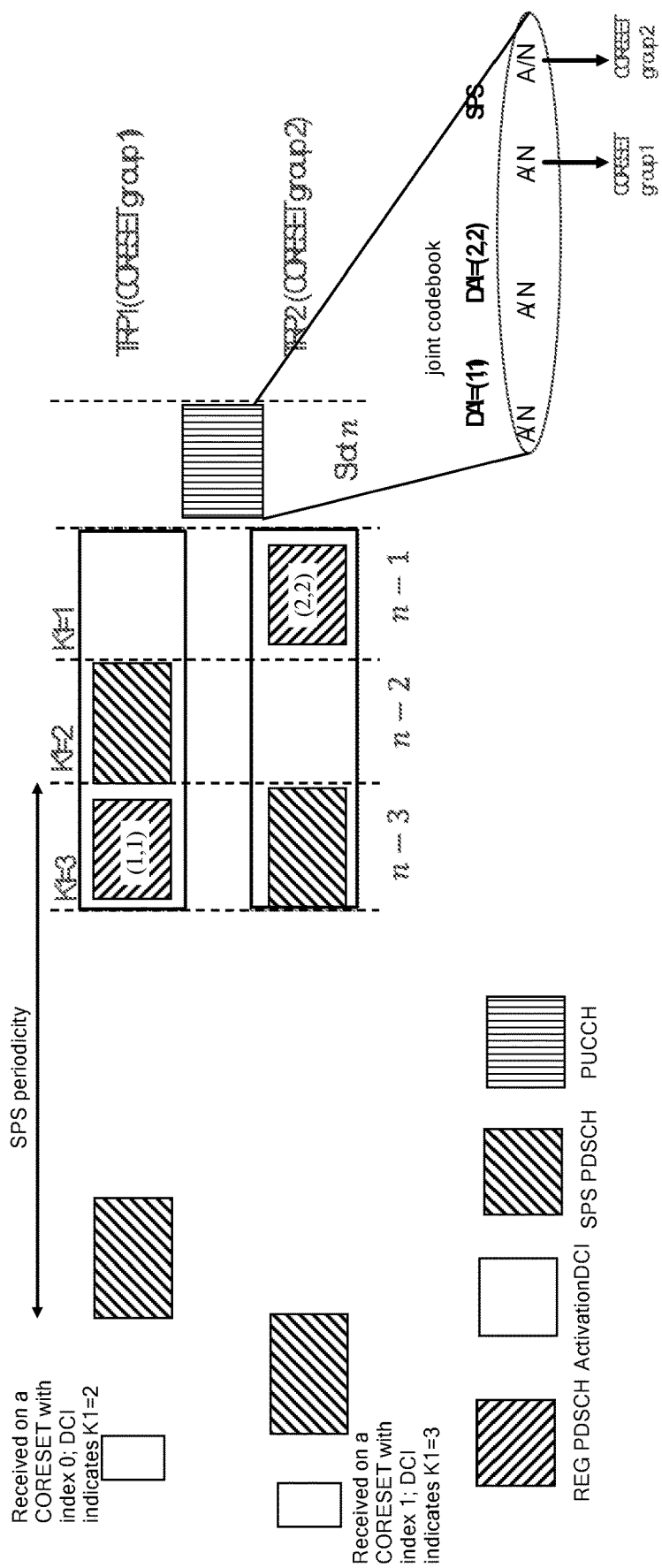

Scenario 2, Case 2, with Type 2 codebook, up to 2 bits of A/N may be allowed in the codebook. For example, the two bits may correspond to the two SPS configurations. In this case, as illustrated in FIG. 11, the UE may append 2 bits of A/N to the end of the HARQ-Ack codebook (if both SPS are activated and UE is configured to receive SPS PDSCHs in a slot n−K1, where K1 is the PDSCH-to-HARQ-feedback timing value for SPS configuration (they can have different K1 values as shown in FIG. 11) and n is the PUCCH slot in which the HARQ-Ack codebook is to be transmitted). In such a case, the first bit may corresponds to the SPS transmission associated with the first CORESET group (e.g., from the first TRP) and the second bit may correspond to the SPS associated with the second CORESET group (e.g., the second TRP).

FIG. 11 illustrates an example of two SPS configurations corresponding to different TRPs, in the case of separate feedback (Scenario 2, Case 2) with Type 2 codebook. As illustrated, a UE may again receive a first DCI on a first CORESET group (e.g., a CORESET with index 0) activating SPS PDSCH transmissions with an indication of K1=2 and a second DCI activating an SPS configuration associated with a second CORESET group (e.g., a CORESET with index 1), but with an indication of K1=3. In this case, two A/N bits corresponding to the two SPS configurations are appended to the codebook entry.

In the figure, values (x,y) represent the counter DAI and total DAI, as indicated in the DCI scheduling PDSCH. For example, in slot n−3, regular PDSCH (1,1) indicates a counter DAI of 1 and a total DAI of 1. Again, it may be noted that DCI for regular PDSCH and A/N for SPS release are not shown.

This same approach may be applied to Scenario 3, but with more than one SPS configuration per TRP (per CORESET group) may be possible, as noted above. For SPS release, the location in the codebook may depend on the DAI value.

For joint dynamic HARQ-ACK codebook among multiple TRPs (m-TRP), there are various options. The example shown in FIG. 11 and described above (for joint dynamic codebook) assumed joint DAI counting (both counter DAI and total DAI) across both TRPs. In this case, counter DAI is jointly counted across both TRPs/CORESET groups (e.g., different higher layer index configured per CORESET) and a total (cumulative) DAI counts the total number of DCIs in a PDCCH monitoring occasion across CCs and TRPs.

In an alternative approach, counter DAI is counted (tracked) per TRP/CORESET group (per value of higher layer index configured per CORESET), while a total DAI (for each TRP/value of higher layer index configured per CORESET) may count the total number of DCIs in a PDCCH monitoring occasion across CCs for each TRP/CORESET group. In this case, HARQ-ACK information bits may be concatenated by the increasing order of TRPs (i.e. different higher layer index configured per CORESET (if configured)). In this case, dynamic HARQ-Ack codebook consists of two sub-codebooks corresponding to the two DAI operations (per TRP). While the codebook option shown in FIG. 11 could be used (to append the two A/N bits for SPS PDSCH reception corresponding to the two TRPs to the end of two sub-codebooks), FIG. 11A shows a different option.

Figure 11A:
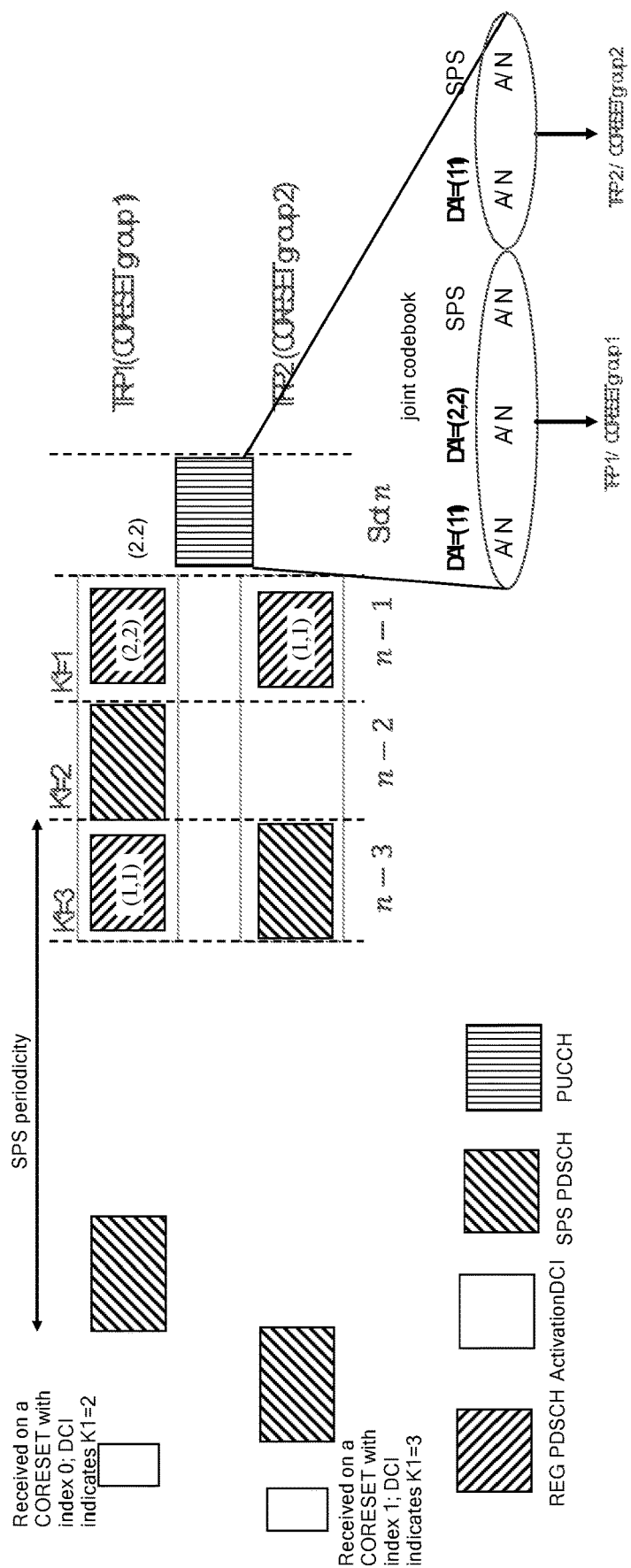

FIG. 11A shows an example that considers Scenario 2 (Two SPS configurations corresponding to different TRPs), Case 2 (joint feedback), and dynamic codebook, with counter DAI (cDAI) and total DAI (tDAI) counted per TRP/CORESET group.

As illustrated, there may essentially two sub-codebooks in the joint codebook. A first sub-codebook corresponds to the first TRP/first higher layer index value configured per CORESET (based on first set of cDAI/tDAI values) and a second sub-codebook corresponds to the second TRP/second higher layer index value configured per CORESET (based on second set of cDAI/tDAI values). For SPS PDSCH reception, up to 2 bits A/N are allowed in the codebook corresponding to the two SPS configurations. As illustrated in FIG. 11A, the UE may append 1 bit A/N to the end of the first sub-codebook (if SPS is activated and is associated with the first TRP/first CORESET group and UE is configured to receive SPS PDSCHs in a slot n−K1, where K1 is the PDSCH-to-HARQ-feedback timing value for SPS configuration and n is the PUCCH slot in which the HARQ-Ack codebook is to be transmitted). Similarly, the UE may append 1 bit A/N to the end of the second sub-codebook for an SPS PDSCH associated with the second TRP/second CORESET group.

The codebook approach shown in FIG. 11A, could be extended to the case where there could be more than one SPS configuration per TRP (per CORESET group). In this case, the UE may append more than 1 bit of A/N to the sub-codebook for any TRP/CORESET group that has more than one SPS configuration.

As noted above, aspects of the present disclosure may also help address SPS activation, SPS release, and PDSCH scrambling for SPS in multi-TRP scenarios.

Figure 12:
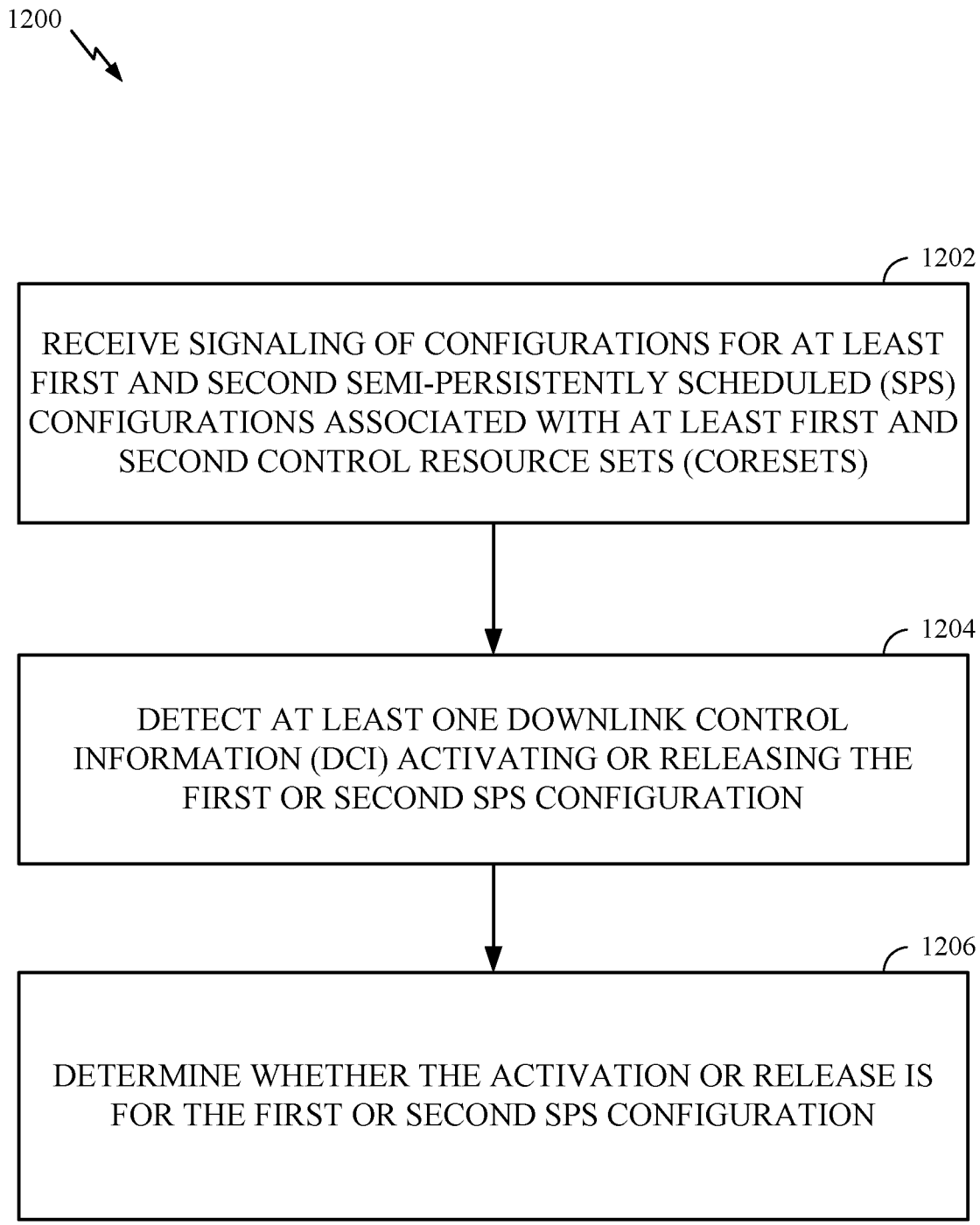
FIG. 12 is a flow diagram illustrating example operations that may be performed by a UE, in accordance with certain aspects of the present disclosure.

FIG. 12 illustrates example operations 1200 for handling SPS activation and SPS release in multi-TRP scenarios, in accordance with certain aspects of the present disclosure. The operations 1200 may be performed, for example, by a UE (e.g., such as a UE 120 in the wireless communication network 100) for processing SPS PDSCH transmissions.

The operations 1200 begin, at 1202, by receiving signaling of configurations for at least first and second semi-persistently scheduled (SPS) configurations associated with at least first and second control resource sets (CORESETs). At 1204, the UE detects at least one downlink control information (DCI) activating or releasing the first or second SPS configuration. At 1206, the UE determines whether the activation or release is for the first or second SPS configuration.

Each SPS configuration, once activated, may result in multiple (e.g., periodic) SPS PDSCH transmissions. In some cases, a UE may operate under the assumption of separate activation/release for different SPS configurations. For Scenario 1, there may be some limitations with respect to receiving DCI for SPS activation/release in only one of the CORESET groups (which is relevant for A/N feedback discussed in more detail above).

For Scenario 2, according to a first option, the two SPS configurations may be associated with higher layer indices (RRC parameter in SPS-Config) corresponding to the CORESET groups (index=0 and index 1). If SPS activation/release is received in a PDCCH in a CORESET group (higher layer index in the CORESET), the corresponding SPS (with the same index in SPS-Config) is activated/released. According to a second option, the two SPS configurations may be associated with two different IDs through higher layer signaling (a RRC parameter in SPS-Config). In such cases, the ID may be explicitly indicated in the activation/release DCI. For activation, the ID may be indicated via the PRI field in the DCI (e.g., as the PRI field is not used in activation as PUCCH resource is given by RRC parameter n1PUCCH-AN, but PRI is used in the release DCI). This second option may also be used for Scenario 3, but instead of two IDs, with multiple IDs.

In some cases, a combination of option 1 and option 2 may be used. For example, SPS ID (0, 1, 2, . . . ) and index (0 and 1) may both be defined in an SPS-configuration. In such cases, different SPS configurations may not be able to both have the same ID and the same index (but may have the same ID or the same index). In some cases, the ID may be used to differentiate different SPS configurations within the same TRP, while the index is used to differentiate TRPs. Both explicit DCI signaling of the ID and the CORESET group in which the DCI is received may be used to determine which SPS is activated/released.

Figure 13:
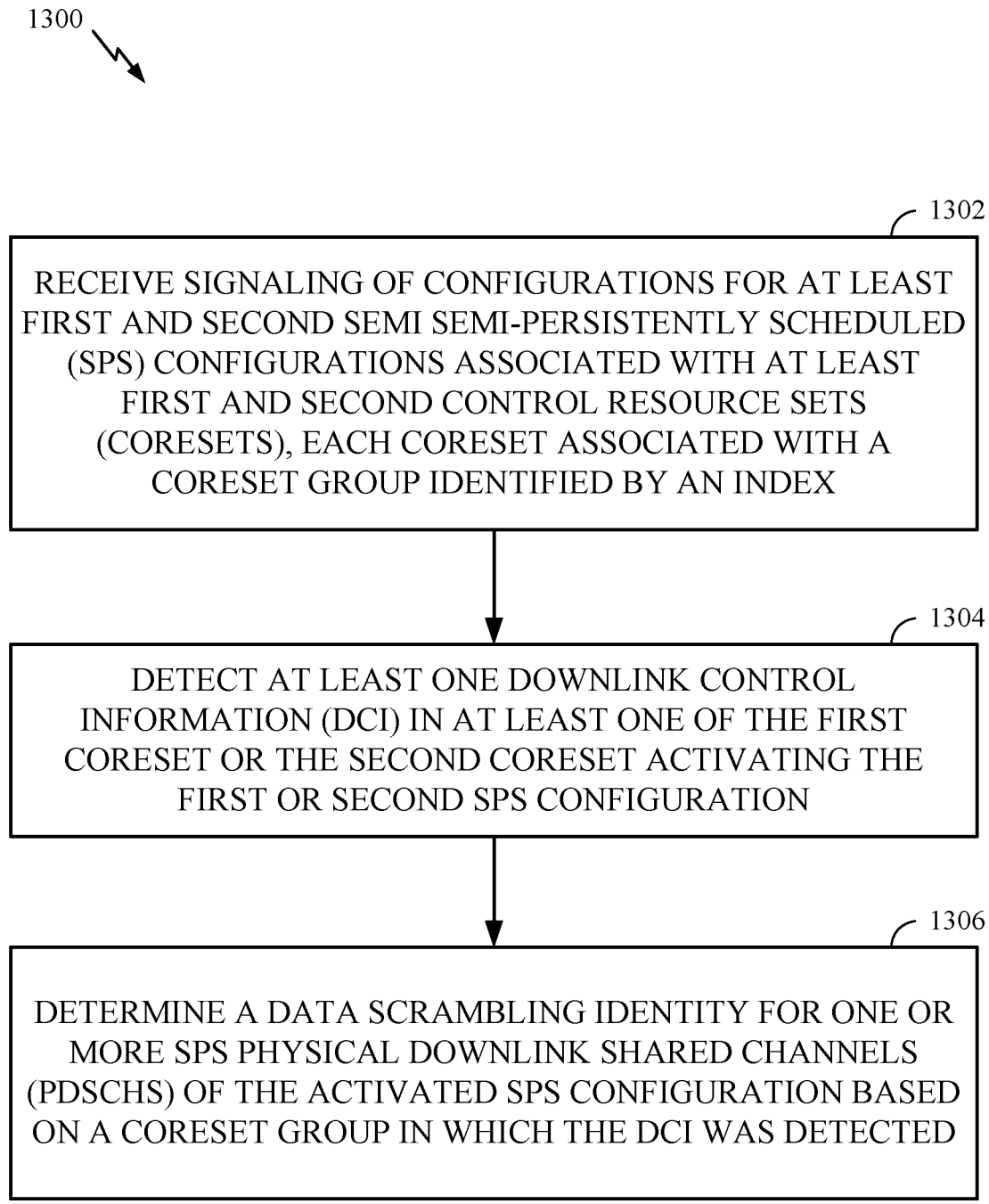
FIG. 13 is a flow diagram illustrating example operations that may be performed by a UE, in accordance with certain aspects of the present disclosure.

FIG. 13 illustrates example operations 1300 for handling PDSCH scrambling for SPS, in accordance with certain aspects of the present disclosure. The operations 1300 may be performed, for example, by a UE (e.g., such as a UE 120 in the wireless communication network 100) for processing SPS PDSCH transmissions.

The operations 1300 begin, at 1302, by receiving signaling of configurations for at least first and second semi semi-persistently scheduled (SPS) configurations associated with at least first and second control resource sets (CORESETs), each CORESET associated with a CORESET group identified by an index. Each SPS configuration, once activated, may result in multiple (periodic) SPS PDSCH transmissions.

At 1304, the UE detecting at least one downlink control information (DCI) activating SPS PDSCH transmission from at least one of the first or second TRPs. At 1306, the UE determines a data scrambling identity for the PDSCH based on a CORESET group in which the DCI was detected.

In certain systems, at least for eMBB with M-DCI NCJT, in order to generate different PDSCH scrambling sequences, enhanced RRC configuration may be supported to configure multiple dataScramblingIdentityPDSCH. It may still be a question how to associate dataScramblingIdentityPDSCH with TRPs. For grant based PDSCH (non-SPS), association of dataScramblingIdentityPDSCH may be based on CORESET group in which the scheduling DCI is received. In this case, one dataScramblingIdentityPDSCH may correspond to one index (e.g., out of the two indices that is also configured per CORESET, e.g. index=0, index=1). When DCI scheduling PDSCH is received in a CORESET with higher layer index (0 or 1), the corresponding dataScramblingIdentityPDSCH is used for PDSCH scrambling.

There is a challenge for SPS, however, as there is no corresponding DCI/PDCCH scheduling the PDSCH. Aspects of the present disclosure propose, instead, that the DCI activating the SPS can be used for determining the CORESET group (index) and hence the corresponding dataScramblingIdentityPDSCH. For SPS PDSCH reception (without a corresponding PDCCH), it could be treated similar as described above, with one dataScramblingIdentityPDSCH corresponding to one index (e.g., out of the two indices that is also configured per CORESET, e.g. index=0, index=1). In addition, SPS configurations may correspond to different TRPs associated with different indices (in SPS-config, index can be 0 or 1 corresponding to the two CORESET groups). The dataScramblingIdentityPDSCH associated with the CORESET group in which the SPS activation DCI is received may be used for SPS PDSCH scrambling.

Example Embodiments

Embodiment 1: A method for wireless communications by a user equipment (UE), comprising: detecting at least one downlink control information (DCI) on each of at least first and second control resource sets (CORESETs), each DCI activating semi-persistently scheduled (SPS) physical downlink shared channel (PDSCH) transmissions according to an SPS configuration; decoding the corresponding SPS PDSCH transmissions; determining a codebook construction of one or more codebooks for providing acknowledgement feedback for the SPS PDSCH transmissions; and providing acknowledgement feedback for the SPS PDSCH transmissions in accordance with the determination.

Embodiment 2: The method of Embodiment 1, wherein: the DCI received in the first CORSET is transmitted from a first transmitter receiver point (TRP); and the DCI received in the second CORSET is transmitted from a second TRP.

Embodiment 3: The method of Embodiment 1 or 2, wherein: the first CORESET is associated with a first CORESET group; the second CORESET is associated with a second CORESET group; the one or more codebooks comprise a codebook associated with the first CORESET group; and the UE provides acknowledgement feedback for each of the SPS PDSCH transmissions from the codebook associated with the first CORESET group.

Embodiment 4: The method of any one of Embodiments 1 through 3, further comprising receiving signaling indicating the codebook construction.

Embodiment 5: The method of any one of Embodiments 1 through 4, wherein: the first CORESET is associated with a first CORESET group; the second CORESET is associated with a second CORESET group; the one or more codebooks comprise first and second codebooks associated with the first and second CORESET groups; and the UE provides acknowledgement feedback for each of the SPS PDSCH transmissions, from the first codebook or the second codebook based on the CORESET group in which the DCI activating the SPS PDSCH transmissions was detected.

Embodiment 6: The method of Embodiment 5, further comprising receiving signaling of an index, for each CORESET, indicating which CORESET group that CORESET belongs to.

Embodiment 7: The method of Embodiment 5 or 6, further comprising: detecting a DCI releasing an SPS configuration associated with one of the first or second CORESETs; and determining the CORESET associated with the released SPS configuration based on a CORESET group in which the DCI releasing the SPS configuration was detected.

Embodiment 8: The method of Embodiment 7, further comprising providing acknowledgement feedback for the release, from a codebook selected based on the CORESET group in which the DCI releasing the SPS PDSCH transmissions was detected.

Embodiment 9: The method of any one of Embodiments 1 through 8, wherein the determined codebook structure comprises a common codebook with entries having bits for acknowledging the SPS PDSCH transmission detected on each of the first and second CORESETs.

Embodiment 10: The method of Embodiment 9, wherein: the common codebook comprises a type 1 hybrid automatic repeat request (HARQ) Acknowledge codebook; the first CORESET is associated with a first CORESET group; the second CORESET is associated with a second CORESET group; and a location of the bits are separately determined based on candidate PDSCH occasions within a reporting window, which are determined separately for each of the CORESET groups.

Embodiment 11: The method of Embodiment 9 or 10, wherein: the common codebook comprises a type 2 hybrid automatic repeat request (HARQ) Acknowledge codebook; the bits are appended to the codebook entry; one of the bits is for acknowledging the SPS PDSCH transmission detected on the first CORESET; and another one of the bits is for acknowledging the SPS PDSCH transmission detected on the second CORESET.

Embodiment 12: The method of Embodiment 11, further comprising: detecting a DCI on at least one of the first and second CORESETs releasing SPS PDSCH transmissions; and providing acknowledgement feedback for the release via one or more bits, wherein a location of the entry within the codebook depends, at least in part, on a downlink assignment index (DAI) value.

Embodiment 13: The method of any one of Embodiments 1 through 12, further comprising: receiving at least two SPS configurations for at least one of the first or second CORESETs.

Embodiment 14: A method for wireless communications by a user equipment (UE), comprising: receiving signaling of configurations for at least first and second semi-persistently scheduled (SPS) configurations associated with at least first and second control resource sets (CORESETs); detecting at least one downlink control information (DCI) activating or releasing the first or second SPS configuration; and determining whether the activation or release is for the first or second SPS configuration.

Embodiment 15: The method of Embodiment 14, wherein: the first CORESET is associated with a first CORESET group; the second CORESET is associated with a second CORESET group; each SPS configuration is associated with one of the first or second CORESET groups; and the UE determines the activation or release is for the SPS configuration associated with the CORESET group in which the DCI activating or releasing the SPS configuration was detected.

Embodiment 16: The method of Embodiment 15, further comprising receiving signaling of an index, for each CORESET, indicating which CORESET group that CORESET belongs to.

Embodiment 17: The method of Embodiment 15 or 16, further comprising: receiving signaling indicating which SPS configuration is associated with which CORESET group.

Embodiment 18: The method of Embodiment 14, wherein: the DCI includes an identifier indicating which SPS configuration the DCI activates or releases.

Embodiment 19: The method of Embodiment 18, further comprising: receiving signaling indicating identifiers for each SPS configuration.

Embodiment 20: The method of Embodiment 18 or 19, wherein: the UE receives at least two SPS configurations for at least one of the first or second CORESETs; and the DCI includes an identifier indicating which of the at least two SPS configurations the DCI activates.

Embodiment 21: The method of Embodiment 20, wherein each SPS configuration has an identifier and is associated with a CORESET group.

Embodiment 22: The method of Embodiment 21, wherein the identifiers are used to differentiate different SPS configurations within the same CORESET group.

Embodiment 23: The method of Embodiment 22, wherein which of the SPS configurations across the CORESET groups is differentiated based on the CORESET group in which the DCI activating or releasing the SPS is received.

Embodiment 24: A method for wireless communications by a user equipment (UE), comprising: receiving signaling of configurations for at least first and second semi semi-persistently scheduled (SPS) configurations associated with at least first and second control resource sets (CORESETs), each CORESET associated with a CORESET group identified by an index; detecting at least one downlink control information (DCI) in at least one of the first CORESET or the second CORESET activating the first or second SPS configuration; and determining a data scrambling identity for one or more SPS physical downlink shared channels (PDSCHs) of the activated SPS configuration based on a CORESET group in which the DCI was detected.

Embodiment 25: The method of Embodiment 24, wherein each of at least two CORESET group indexes is associated with a different data scrambling identity.

Embodiment 26: The method of Embodiment 25, wherein each SPS configuration corresponds to a different CORESET group are associated with different indexes.

Embodiment 27: The method of Embodiment 25 or 26, wherein the data scrambling identity associated with the CORESET group in which the DCI is detected is used for SPS PDSCH scrambling.

Embodiment 28: An apparatus for wireless communications by a user equipment (UE), comprising: means for detecting at least one downlink control information (DCI) on each of at least first and second control resource sets (CORESETs), each DCI activating semi-persistently scheduled (SPS) physical downlink shared channel (PDSCH) transmissions according to an SPS configuration; means for decoding the corresponding SPS PDSCH transmissions; means for determining a codebook construction of one or more codebooks for providing acknowledgement feedback for the SPS PDSCH transmissions; and means for providing acknowledgement feedback for the SPS PDSCH transmissions in accordance with the determination.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 8, 12, and 13 may be performed by various processors shown in FIG. 4, such as processors 466, 458, 464, and/or controller/processor 480 of the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8, 12 and/or 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    detecting at least one downlink control information (DCI) on each of at least first and second control resource sets (CORESETs), each DCI activating semi-persistently scheduled (SPS) physical downlink shared channel (PDSCH) transmissions according to an SPS configuration;
    decoding the corresponding SPS PDSCH transmissions;
    determining a codebook construction of one or more codebooks for providing acknowledgement feedback for the SPS PDSCH transmissions, wherein the codebook construction indicates separate codebooks providing a separate acknowledgement feedback or a single codebook providing a joint acknowledgement feedback for the SPS PDSCH transmissions; and
    providing acknowledgement feedback for the SPS PDSCH transmissions in accordance with the determination.

2. The method of claim 1, wherein:
    the DCI received in the first CORSET is transmitted from a first transmitter receiver point (TRP); and
    the DCI received in the second CORSET is transmitted from a second TRP.

3. The method of claim 1, wherein:
    the first CORESET is associated with a first CORESET group;
    the second CORESET is associated with a second CORESET group;
    the one or more codebooks comprise a codebook associated with the first CORESET group; and
    the UE provides acknowledgement feedback for each of the SPS PDSCH transmissions from the codebook associated with the first CORESET group.

4. The method of claim 1, further comprising receiving signaling indicating the codebook construction.

5. The method of claim 1, wherein:
    the first CORESET is associated with a first CORESET group;

the second CORESET is associated with a second CORESET group;
the one or more codebooks comprise first and second codebooks associated with the first and second CORESET groups; and
the UE provides acknowledgement feedback for each of the SPS PDSCH transmissions, from the first codebook or the second codebook based on the CORESET group in which the DCI activating the SPS PDSCH transmissions was detected.

6. The method of claim 5, further comprising receiving signaling of an index, for each CORESET, indicating which CORESET group that CORESET belongs to.

7. The method of claim 5, further comprising:
detecting a DCI releasing an SPS configuration associated with one of the first or second CORESETs; and
determining the CORESET associated with the released SPS configuration based on a CORESET group in which the DCI releasing the SPS configuration was detected.

8. The method of claim 7, further comprising providing acknowledgement feedback for the release, from a codebook selected based on the CORESET group in which the DCI releasing the SPS PDSCH transmissions was detected.

9. The method of claim 1, wherein the determined codebook structure comprises a common codebook with entries having bits for acknowledging the SPS PDSCH transmission detected on each of the first and second CORESETs.

10. The method of claim 9, wherein:
the common codebook comprises a type 1 hybrid automatic repeat request (HARQ) Acknowledge codebook;
the first CORESET is associated with a first CORESET group;
the second CORESET is associated with a second CORESET group; and
a location of the bits are separately determined based on candidate PDSCH occasions within a reporting window, which are determined separately for each of the CORESET groups.

11. The method of claim 9, wherein:
the common codebook comprises a type 2 hybrid automatic repeat request (HARQ) Acknowledge codebook;
the bits are appended to the codebook entry;
one of the bits is for acknowledging the SPS PDSCH transmission detected on the first CORESET; and
another one of the bits is for acknowledging the SPS PDSCH transmission detected on the second CORESET.

12. The method of claim 11, further comprising:
detecting a DCI on at least one of the first and second CORESETs releasing SPS PDSCH transmissions; and
providing acknowledgement feedback for the release via one or more bits, wherein a location of the entry within the codebook depends, at least in part, on a downlink assignment index (DAI) value.

13. The method of claim 1, further comprising:
receiving at least two SPS configurations for at least one of the first or second CORESETs.

14. A method for wireless communications by a user equipment (UE), comprising:
receiving signaling of configurations for at least first and second semi-persistently scheduled (SPS) configurations associated with at least first and second control resource sets (CORESETs), wherein each CORESET is associated with a different CORESET group;

detecting at least one downlink control information (DCI) activating or releasing the first or second SPS configuration; and
determining whether the activation or release is for the first or second SPS configuration based on a CORESET group associated with the first or second SPS configuration in which the DCI activating or releasing the SPS configuration was detected.

15. The method of claim 14, wherein:
the first CORESET is associated with a first CORESET group;
the second CORESET is associated with a second CORESET group;
each SPS configuration is associated with one of the first or second CORESET groups; and
the UE determines the activation or release is for the SPS configuration associated with the first CORESET group or the second CORESET group in which the DCI activating or releasing the SPS configuration was detected.

16. The method of claim 15, further comprising receiving signaling of an index, for each CORESET, indicating which CORESET group that CORESET belongs to.

17. The method of claim 15, further comprising:
receiving signaling indicating which SPS configuration is associated with which CORESET group.

18. The method of claim 14, wherein:
the DCI includes an identifier indicating which SPS configuration the DCI activates or releases.

19. The method of claim 18, further comprising:
receiving signaling indicating identifiers for each SPS configuration.

20. The method of claim 18, wherein:
the UE receives at least two SPS configurations for at least one of the first or second CORESETs; and
the DCI includes an identifier indicating which of the at least two SPS configurations the DCI activates.

21. The method of claim 20, wherein each SPS configuration has an identifier and is associated with a CORESET group.

22. The method of claim 21, wherein the identifiers are used to differentiate different SPS configurations within the same CORESET group.

23. The method of claim 22, wherein which of the SPS configurations across the CORESET groups is differentiated based on the CORESET group in which the DCI activating or releasing the SPS is received.

24. A method for wireless communications by a user equipment (UE), comprising:
receiving signaling of configurations for at least first and second semi-persistently scheduled (SPS) configurations associated with at least first and second control resource sets (CORESETs), each CORESET associated with a different CORESET group identified by an index;
detecting at least one downlink control information (DCI) in at least one of the first CORESET or the second CORESET activating the first or second SPS configuration; and
determining a data scrambling identity for one or more SPS physical downlink shared channels (PDSCHs) of the activated SPS configuration based on a CORESET group in which the DCI was detected, wherein the determined data scrambling identity is associated with the CORESET group in which the DCI was detected.

25. The method of claim 24, wherein each of at least two CORESET group indexes is associated with a different data scrambling identity.

26. The method of claim 25, wherein each SPS configuration corresponds to a different CORESET group are associated with different indexes.

27. The method of claim 25, wherein the data scrambling identity associated with the CORESET group in which the DCI is detected is used for SPS PDSCH scrambling.

28. An apparatus for wireless communications by a user equipment (UE), comprising:
   means for detecting at least one downlink control information (DCI) on each of at least first and second control resource sets (CORESETs), each DCI activating semi-persistently scheduled (SPS) physical downlink shared channel (PDSCH) transmissions according to an SPS configuration;
   means for decoding the corresponding SPS PDSCH transmissions;
   means for determining a codebook construction of one or more codebooks for providing acknowledgement feedback for the SPS PDSCH transmissions, the codebook construction indicates separate codebooks providing a separate acknowledgement feedback or a single codebook providing a joint acknowledgement feedback for the SPS PDSCH transmissions; and
   means for providing acknowledgement feedback for the SPS PDSCH transmissions in accordance with the determination.

* * * * *